United States Patent [19]
Hoffmann et al.

[11] Patent Number: 5,612,541
[45] Date of Patent: Mar. 18, 1997

[54] ULTRAVIOLET RADIATION MONITORING DEVICE AND USE THEREOF

[75] Inventors: Donald J. Hoffmann, Elmhurst; John C. H. Chang, Naperville, both of Ill.

[73] Assignee: Wallace Computer Services, Inc., Hillside, Ill.

[21] Appl. No.: 446,311

[22] Filed: May 22, 1995

[51] Int. Cl.$^6$ ........................................ G01J 1/38
[52] U.S. Cl. ........................................ 250/474.1
[58] Field of Search ........................................ 250/474.1

[56] References Cited

U.S. PATENT DOCUMENTS

| | | | |
|---|---|---|---|
| 3,787,687 | 1/1974 | Trumble | 250/474.1 |
| 4,130,760 | 12/1978 | Fanselow et al. | 250/474.1 |
| 4,308,459 | 12/1981 | Williams | 250/474.1 |
| 4,829,187 | 5/1989 | Tomita et al. | 250/474.1 |
| 4,985,632 | 1/1991 | Bianco et al. | 250/372 |
| 5,117,116 | 5/1992 | Bannard et al. | 250/474.1 |
| 5,206,118 | 4/1993 | Sidney et al. | 250/474.1 |
| 5,411,835 | 5/1995 | Brinser | 250/474.1 |

OTHER PUBLICATIONS

"Sun Aware UV Intensity Meter" by Teraco (promotional literature), undated.
"Ozone Hole Over Antarctic Stays Same", Chicago Tribune, Section 1, Friday, Oct. 7, 1994.
"Golfers Discover Dark Side of Sun—Often, Too Late", Hanley, Section 4, Chicago Tribune, Thursday, Jul. 28, 1994.
"Faulty Gene Linked to Melanoma, Defective Version Opens Way for Cancer, Scientists Say", Assoc. Press, Sect. 1, Chicago Tribune, Thurs., Sep. 1, 1994.
"The Weatherman Now Gives Us a Daily Solar Warning", terHorst, Section 2, Daily Herald, Wednesday, Jul. 20, 1994.
"Ozone Hole", Vogel, Earth, Jan. 1993, pp. 32–35.
"Your Health—Ozone Rays", Verespej, Industry Week, Jul. 4, 1994, p.19.
"UV Index: Watch It and You Won't Get Burned", Lang, Chicago Sun Times, Wednesday, Jul. 6, 1994.
"No More Fun in the Sun", Alexander, The Walking Magazine, Jul./Aug. 1995, p. 25.
"Sun Lovers a Little Hazy on UV Index", Cauvin, Chicago Tribune, Jul. 2, 1994, Section 1, p. 5.

*Primary Examiner*—Carolyn E. Fields
*Attorney, Agent, or Firm*—Roylance, Abrams, Berdo & Goodman, L.L.P.

[57] ABSTRACT

An ultraviolet radiation monitoring kit comprising at least one first substrate and at least one second substrate, the second substrate being capable of being closely associated with at least one first substrate, the first substrate having an indicator area comprising a chromogenic composition, the chromogenic composition comprising (a) the colored reaction product of a chromogen and a color developer, the colored reaction product being capable of changing color when exposed to ultraviolet radiation, or (b) a substantially colorless mixture of a chromogen and a color developer capable of reacting to form color when exposed to ultraviolet radiation, the second substrate bearing a reference color chart, the reference color chart comprising at least one reference color corresponding to time exposure to ultraviolet radiation, such that comparison of the color developed by the chromogenic composition upon exposure to ultraviolet light with a reference color provides an indication of the time and degree of exposure to ultraviolet radiation.

32 Claims, 3 Drawing Sheets

ULTRAVIOLET RADIATION MONITORING DEVICE AND USE THEREOF

FIELD OF THE INVENTION

The present invention is directed to a device for monitoring exposure of the human skin to ultraviolet radiation, the use of such device to avoid overexposure of human skin to harmful radiation and preparation of such device. More particularly, this invention relates to a disposable, easily useable, ultraviolet radiation monitoring device utilizing a chromogenic composition in combination with a reference color chart to monitor exposure to ultraviolet radiation and warn the user before overexposure.

Background of the Invention

Sunlight is normally divided into infrared energy, visible light, and ultraviolet light. Infrared energy consists of wavelength above 760 nanometers. Visible light is defined as radiation between 400 and 760 nanometers. Ultraviolet lights consists of radiation below 400 nanometers. Infrared energy is our main source of warmth. Sunlight supplies energy necessary for photosynthesis in the living plants. In fact, it is essential for all living things on earth.

In leisure time, some people like to bask in the sun to get a healthy looking tan. Many people like to enjoy months of uninhibited sunshine by participating in other outdoor activities. However, research has found that increased exposure to ultraviolet rays from the sun causes skin cancer, cataracts in human eyes, sunburn, skin wrinkling, possible immune system damage, and leathery skin. It also causes cacti to shrivel, cattle and sheep to develop conjunctivitis, eucalyptus trees to turn yellow, frog population to decline, and fish population to decrease. Humans are among the living beings most vulnerable to the constant shower of ultraviolet radiation. Unprotected by scales or feathers, we face a rising threat of illness related to sunlight exposure. The new health hazard is challenging our desire to spend time outdoors. The causes of skin cancer have been on the rise steadily for the last 20 years and has become one of the leading causes of death today. One in six Americans might develop skin cancer in their lifetime because sun damage to the skin is cumulative.

Hovering six to 25 miles above the earth, the stratospheric ozone layer is our natural sunscreen, protecting us from some of the sun's harmful rays. Atmospheric scientists at National Aeronautics and Space Administration have used satellites to study the depletion of ozone in the upper atmosphere. There is evidence that a severe depletion of the ozone layer has occurred over the Antarctic, resulting in an ozone hole of about 9 million square miles in 1994 (about 2.5 times the size of the United States of America). The hole in the ozone layer is caused by chlorofluorocarbons (CFCs) which are commonly used as refrigerant and propellant in aerosol sprays. The CFCs undergo a series of chemical reactions in the atmosphere, leading to the production of chlorine monoxide which eats up ozone. Levels of ozone destroying chlorine monoxide in Antarctic are extremely high by August, carving a hole in the ozone shield that filters out damaging ultraviolet radiation in the sunlight. As the wind whips around the globe, the ozone layer becomes thinner at most latitudes. During the last decade, the annual dose of harmful ultraviolet light striking the northern hemisphere rose by about five percent, according to the United Nations Report.

The sun gives off ultraviolet light. The International Commission on Illumination further subdivides the portion of the spectrum into UV-A, UV-B and UV-C rays.

UV-A rays have the longest wavelength of 400 to 315 nanometers and penetrate the skin the deepest. UV-A light is also the most difficult one to screen out, although ozone and clouds do screen some of it out. It goes right through the ozone layer. Many sunscreens do not protect against it very well. It is just as strong at 9 am as at noon.

UV-B rays are in the wavelength region of 315 to 280 nanometers. Although some of them are screened out by ozone and clouds, many of them do reach the earth to harm us. UV-B light is responsible for wrinkling, breaking down the elastic tissue and collagen, and sunburn. UV-B light is probably 100 times more carcinogenic than UV-A light. It causes three types of skin cancer—basal cell cancer, squamous cell cancer, and melanoma. Skin cancers have skyrocketed in the last 20 years, coinciding with our increased outdoor activities and the depletion of the ozone layer. UV-B light is probably the culprit for the tough leathery look of human skin. However, when the ozone layer is thick enough to function properly, it shields us from most UV-B rays.

UV-C rays are the shortest, having a wavelength of 280 to 100 nanometers, and are actually the most dangerous among all ultraviolet rays, but do not reach the earth.

The National Weather Service, urged by the Environmental Protection Agency, the Centers for Disease Control, and the American Cancer Society, has begun a new index of UV radiation on a trial basis to warn people against overexposure to the sun. The index based on atmospheric changes has a scale of from 0 to 15. The higher the number, the higher the risk to skin cancer and the faster that outdoor enthusiast will burn. To predict the Ultraviolet Potential Index, the National Weather Service uses satellites and ground equipment to compute the UV levels through a combination of readings from forecasted cloud cover, temperatures, and local ozone amounts. The more ozone present at a location, the less radiation will reach the earth's surface at that area. A rating of 7 means that fair-skinned people should stay out of the sun or risk high UV exposure.

The new Ultraviolet Potential Index measures potential exposure in five levels as follows, according to the National Weather Service and the American Cancer Society:

0 to 2: Minimal risk of ultraviolet radiation; could be in sun unprotected for more than an hour without skin burning.

3 to 4: Low risk; could be in the sun unprotected for 30 minutes to an hour.

5 to 6: Moderate risk; could be in sun unprotected for 20 to 30 minutes.

7 to 9: High risk of skin damage at 13 minutes.

10 to 15: Very high risk of skin damage occurs at less than 13 minutes.

As of July 1994, only 85 cities in the United States were given the predicted Ultraviolet Potential Index on a trial basis. It would be very difficult to include all parts of the nation. These predicted index numbers can serve as general guidelines only. The local cloud cover might move away or become thick because weather conditions are unpredictable. Thus, there is a need for a device to warn outdoor enthusiasts against overexposure to the sunlight anywhere.

To reduce the ultraviolet radiation exposure, it is advisable to apply sunscreen, having a Sun Protection Factor (SPF) of at least 15 and above, on the skin. The sunscreen contains ultraviolet light absorbers which remove part or most harmful ultraviolet rays, depending upon the amount of the absorbers in the sunscreen. By applying the sunscreen on the skin, one might mistakenly believe that the skin will not be damaged by the ultraviolet light. In fact, the sunscreen does not completely block all UV-A and UV-B rays in the sunlight. UV radiation cannot be seen, felt, or smelled.

Various devices have been proposed for monitoring exposure to ultraviolet radiation, such as those disclosed in U.S. Pat. Nos. 4,985,632; 5,117,116; 4,308,459; 4.130,760; and 3,787,687 However, previous suggestions have various drawbacks including use of cumbersome mechanical devices, use of carcinogenic compounds for indicating exposure by color indication, or the like.

SUMMARY OF THE INVENTION

An ultraviolet monitoring system has now been discovered which is simple and safe to use, while providing accurate indication of time and degree of exposure to ultraviolet radiation.

The sunlight dosimeter system of the present invention may be in the form of an ultraviolet radiation monitoring kit comprising at least one first substrate and at least one second substrate, the second substrate being capable of being closely associated with at least one first substrate, the first substrate having a first surface bearing an indicator area comprising a chromogenic composition comprising (a) the colored reaction product of a chromogen and a color developer capable of forming a second color when exposed to ultraviolet radiation, or (b) a substantially colorless mixture of a chromogen and a color developer capable of reacting to form a first color when exposed to ultraviolet radiation. The second substrate has a first surface bearing a reference color chart comprising at least one reference color corresponding to time exposure to ultraviolet radiation, such that comparison of a color developed by the chromogenic composition upon exposure to ultraviolet light with a reference color provides an indication of the time and degree of exposure to ultraviolet radiation.

According to one embodiment of the present invention the indicator area is provided adjacent the reference color chart on the same substrate, and in accordance with this embodiment of the invention, an ultraviolet radiation monitoring device is provided which comprises a first substrate having a first surface bearing an indicator area comprising a chromogenic composition, said chromogenic composition comprising (a) a substantially colorless mixture of a chromogen and a color developer capable of reacting to form color when exposed to ultraviolet radiation, or (b) the colored reaction product of a chromogen and a color developer, the first substrate bearing a reference color chart adjacent the indicator area, the reference color chart comprising at least one reference color corresponding to time exposure to a reference quantity of ultraviolet radiation, such that comparison of the color developed by the chromogenic composition upon exposure to ultraviolet light with a reference color provides an indication of the time and degree of exposure to ultraviolet radiation.

According to another embodiment of the present invention, the substrate having a first surface bearing an indicator area has a second surface provided with a pressure sensitive adhesive. The pressure sensitive adhesive is "dual-functional", since it can serve to adhere the indicator of the ultraviolet radiation monitoring device to the skin or clothing to obtain a reading of the degree of ultraviolet radiation which is substantially identical to that received by the skin or adjacent clothing. In addition, the pressure sensitive adhesive can function to adhere an indicator sheet to another indicator sheet to form a multi-ply tear-off pad.

According to a further embodiment of the present invention, a method for improving coverage of a chromogenic reaction product over a predetermined area of a substrate is provided by a method which comprises providing a first substrate having a first surface for receiving a chromogenic composition, the first substrate having a color developer distributed throughout its structure, and contacting the first surface of the first substrate with a chromogen or color former to develop a colored reaction product in the first surface of the first substrate. Preferably, the first surface of the first substrate is provided with a coating of pressure-rupturable microcapsules containing the chromogen, and pressure is applied to the microcapsules to release the chromogen for reaction with the color developer to form said colored reaction product.

Other advantages and salient features of the present invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure.

DETAILED DESCRIPTION OF THE INVENTION

Figure 1:
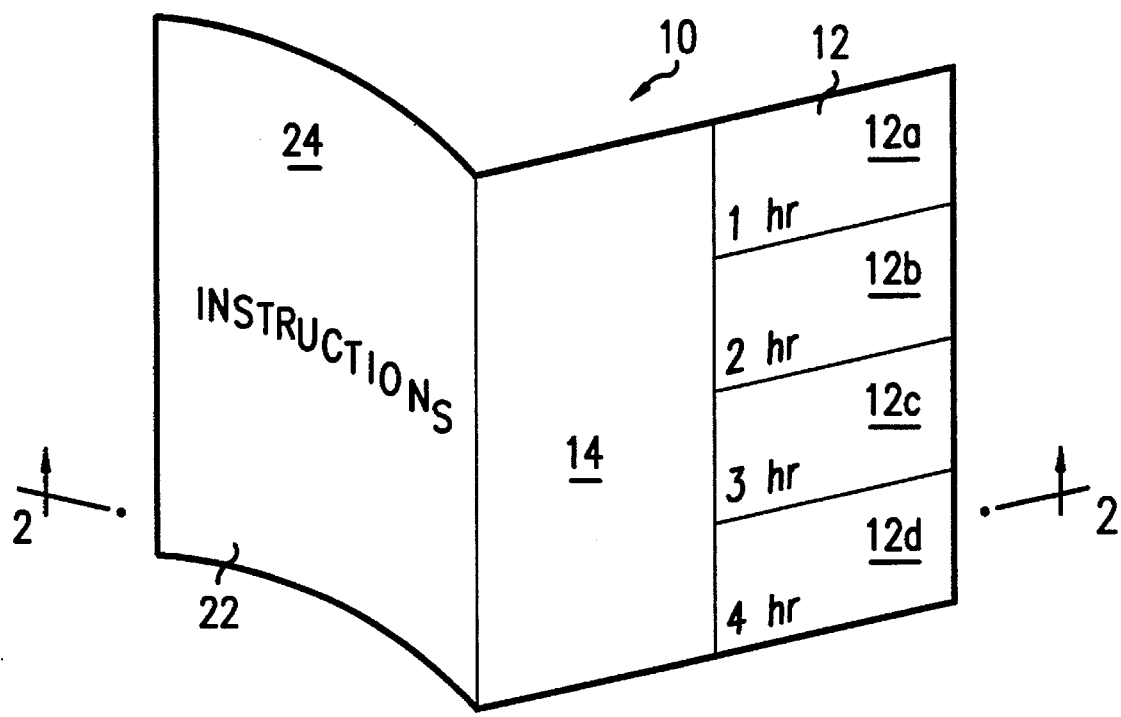
FIG. 1 is a perspective, schematic view of the ultraviolet radiation monitoring device of the present invention in booklet form.

Referring to the drawings, FIG. 1 illustrates an ultraviolet radiation monitoring device 10 having a color chart section 12 having colors 12a, 12b, 12c and 12d each corresponding to a different time exposure to ultraviolet radiation. Thus, for example, color 12a corresponds to one hour of exposure time to ultraviolet radiation, while color 12b corresponds to 2 hours exposure time to ultraviolet radiation, etc.

Monitoring device 10 is also provided with a section 14 which may be a coating of a mixture of substantially colorless chromogen and a substantially colorless color developer which react to form a visible color, such as a light red, under the action of ultraviolet radiation, and as exposure to ultraviolet radiation continues, the color changes, for example, from light red to orange, and then to yellow.

The chromogen used to form the coating in section 14 in preferred embodiments is solid and substantially colorless before reacting with the color developer to produce the colored image. Suitable chromogenic compounds include diarylmethanes, triarylmethanes, indolylphthalides, azaphthalides, fluorans, and spiropyrans. Exemplary diarylmethanes include 4,4'-bis(dimethylaminobenzhydrylbenzyl)ether, N-halophenyl leuco auramine, and N-2,4,5-trichlorophenyl leuco auramine. Examples of triarylmethanes include 3,3-bis(p-dimethylaminophenyl)-6-dimethylaminophthalide and 3,3-bis(p-dimethylaminophenyl)phthalide. Examples of indolylphthalides include 3-(p-dimethylaminophenyl)-3-(1,2-dimethylindole-3-yl)phthalide, 3,3-bis(1-octyl-2-methylindole-3-yl)phthalide and 3-(p-dimethylaminophenyl)-3-(2-methylindole-3-yl)phthalide. Examples of azaphthalides include 3-(2-ethoxy-4-diethylaminophenyl)-3-(1-octyl-2-methylindole-3-yl)-4-azaphthalide and 3-(2-ethoxy-4-diethylaminophenyl)-3-(1-ethyl-2-methylindole-3-yl)-4-azaphthalide. Examples of fluorans include 2-dibenzylamino-6-diethylaminofluoran, 2-anilino-6-diethylaminofluoran, 3-methyl-2-anilino-6-diethylaminofluoran, 2-anilino-3-methyl-6-(ethyl-iso-pentylamino)fluoran, 2-anilino-3-methyl-6-dibutylamino-fluoran, 2-chloro-3-methyl-6-diethylaminofluoran, 3,6-dimethoxyfluoran, and 7,7'-bis(3-diethylaminofluoran). Examples of spiropyrans include 3-methylspiro-dinaphthopyran, 3-ethylspirodinaphthopyran, 3,3'-dichlorospirodinaphthopyran, 3-benzylspirodinaphthopyran, and 3-methylnaphtho-(3-methoxybenzo)spiropyran. Other suitable chromogenic compounds are disclosed in U.S. Pat. Nos. 3,821,010; 3,954,803; and 4,104,437 to Vincent and Chang, the disclosures of which are hereby incorporated by reference.

The chromogenic coating composition is prepared by a procedure in which solid chromogen and inorganic pigment in an aqueous solution of a binder are ground to an average particle diameter of between about 1 and about 10 microns, preferably from about 3 to about 7 microns, especially about 5 microns. Suitable pigments include kaolin clay, talc, titanium dioxide, calcium carbonate, magnesium carbonate, barium carbonate, zinc oxide, silicone oxide, aluminum oxide, and the like. Suitable amounts of pigment include from about 1 percent to about 30 percent by weight, and preferably about 5 percent to about 15 percent by weight, based on the total weight of the solids of the coating composition.

Useful binders include starch, hydroxyethyl cellulose, methyl cellulose, carboxymethyl cellulose, gelatin, casein, gum arabic, polyvinyl alcohol, styrene-maleic anhydride copolymers, ethylene-acrylic acid copolymers, styrene-butadiene copolymers, acrylonitrilebutadiene copolymers, vinyl acetate emulsions, ethylenevinyl acetate emulsions. The amount of binder generally used is about 1 percent to about 30 percent by weight, and preferably about 5 percent to about 15 percent by weight, based on the total weight of the solids of the coating composition.

Separately, a solid color developer may be ground with a sensitizer in an aqueous solution of a binder until an average particle diameter of between about 1 and about 10 microns, preferably from about 3 to about 7 microns, especially about 5 microns, is obtained.

The color developer of the present invention is an electron-acceptor material in the form of a Lewis acid. However, the Lewis acid of the present invention is not of the type normally preferred for use in the preparation of carbonless copy papers where good color stability is required. The Lewis acids of the present invention are those which have poor color stability, i.e., they react with a color former to form a colored image which, when exposed to sunlight, will change and have an intensity that will substantially decrease over the course of a few hours. In other words, upon reaction with the chromogen, the poor color stability of the Lewis acid causes the initial color formed, which may have a good initial color intensity, to fade quickly from one color to another within a few hours under exposure to ultraviolet radiation. The resultant fading colors correspond to time of exposure to ultraviolet radiation in a controlled tester, and such colors can be permanently duplicated as non-fading colors for the desired time interval, such as one hour exposure, two hours exposure, etc., to form the colors 12a . . . 12d of the color chart section 12.

Suitable Lewis acids include attapulgite clay, silica, zinc oxide, non-metal chelated phenols, such as tertiary butylphenols, octyl phenol, bisphenol A, nonmetal chelated phenolic novolac alkyl salicylic acids, and salicylic acid resins, and the like.

Suitable sensitizers include benzophenone, 4,4'-bis(dimethylamino)benzophenone, 4,4'-bis(diethylamino) benzophenone, and the like.

The dispersion of chromogen is mixed with the dispersion of color former and coated on the substrate to form section 14 of FIG. 1. When section 14 is subjected to sunlight, a colored background is progressively developed in section 14. Depending upon the chromogen and Lewis acid selected, and the length of exposure time, the color developed is matched with a reference color in section 12 by the user to determine the amount of exposure to ultraviolet radiation received to enable the individual to determine how long to remain exposed to the sun.

Figure 2:
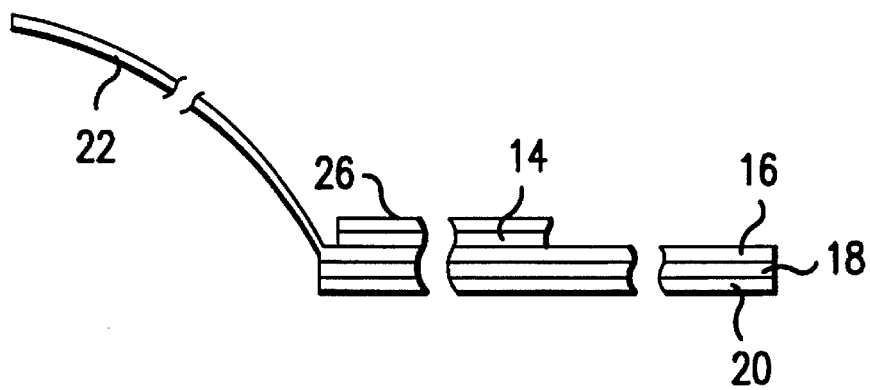
FIG. 2 is an enlarged, diagrammatic crosssectional view taken along line 2—2 of FIG. 1 showing the laminate construction of the radiation monitoring device of the present invention.

As shown in FIG. 2, coating 14 is supported by substrate 16, which may be a cellulosic material, such as paper, or may be vinyl film, polyester, polyethylene, polypropylene, polystyrene, polyamide, cloth or the like. Substrate 16 is, in turn, coated with a pressure sensitive adhesive 18 which, in turn, is backed by a release liner 20. Thus, if desired, release liner 20 may be peeled off to expose pressure sensitive adhesive 18 to permit monitor 10 to be adhered to the skin or clothing, such as a bathing suit, to determine the degree of ultraviolet radiation exposure.

Suitable pressure-sensitive adhesives include, for example, water-based emulsions, such as synthetic acrylic polymer emulsions in water, including Nacor 4551 commercially available from National Starch and Chemical Company, Flexcryl 1685 commercially available from Air Products and Chemicals Inc., and 3-40518-01F commercially available from Swift Adhesives Division of Reichold Chemicals, Inc. Likewise, hot melt adhesives may be employed as pressure-sensitive adhesive 18. For example, such adhesives may be compounded mixtures of an elastomer such as styrene-isoprene triblock co-polymer, a tackifier such as rosin esters or terpenes, and a plasticizer such as low molecular weight phthalate, benzoate esters, and petroleum hydrocarbon oils. Examples are Durotak 4144 commercially available from National Starch and Chemical Company and Swift 84441 commercially available from Swift Adhesives Division of Reichold Chemicals, Inc. Other pressure sensitive adhesives include, a pressure-sensitive adhesive including acrylate copolymer microspheres, such as the adhesives disclosed in U.S. Pat. No. 3,691,140 to Silver and U.S. Pat. No. 3,857,731 to Merrill et al., the disclosures of which are hereby incorporated by reference. Also useful is the removable or repositional water-based, pressure-sensitive adhesive known as Stik-Withit SW 101 J, commercially available from Paper Conversions, Inc. of Syracuse, New York, which has the properties of low tack and clean removability. Other useful adhesives having such characteristics are Aroset 2551-W-52, Aroset 2532-W-50, and Aroset 2556-W-54 commercially available from Ashland Chemical, Inc. and Nacor 4536 from National Starch and Chemical Company.

If desired, users of sunscreen can apply the same sunscreen used for their skin to section 14 of dosimeter 10 to simulate actual exposure of the ultraviolet radiation to their skin. Optionally, coating 14 can be overcoated with a clear varnish or other protective coating 26 as shown in FIG. 2 to protect chromogenic composition coating 14 and receive suntan lotion or sunscreen.

Flap 22 is provided to protect coating 14 from exposure to ultraviolet radiation until use. As indicated in FIG. 1 instructions for use of the monitor or other desired information may be imprinted on the inside surface 24 of flap 22.

In order to scientifically define a reference color chart, a selected chromogen coating composition is exposed in a controlled testing environment. For example, suitable equipment includes an Accelerated Weathering Tester, manufactured by The Q-Panel Company, Cleveland, Ohio. The Tester employs a variety of light sources to simulate sunlight and the damage caused by sunlight. To simulate UV-A and UV-B rays in sunlight, UVA-340 lamps and UVB-313 lamps may be used in this invention. UVA-340 lamp's special phosphor produces an energy spectrum with a peak emission at 340 nanometers. It is the best available simulation of sunlight in the critical, short wavelength ultraviolet region between 365 nanometers and the solar cut-off of 295 nanometers. A UVB-313 lamp has a peak emission of 313 nanometers with some output in the UV-A and visible regions. Using such equipment, a selected chromogenic composition is tested and its color duplicated using a non-fading dye on the reference color chart for each particular time of exposure, e.g., one, two and three hours, respectively. Thus, regardless of the weather conditions or block used, the end user can determine the actual equivalent ultraviolet radiation received while exposed to the sun.

Figure 3:
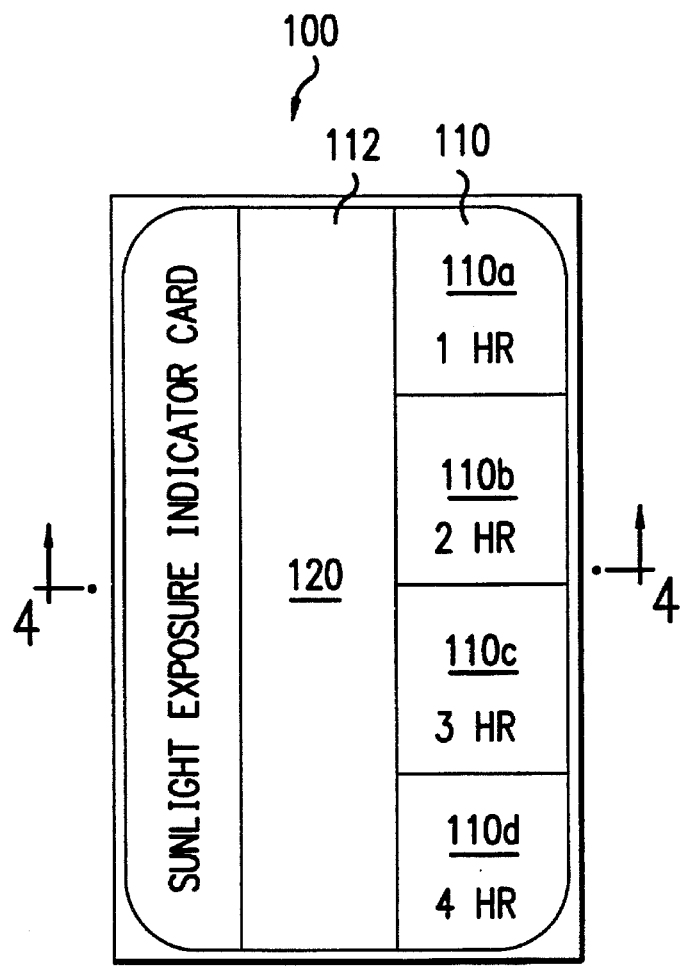
FIG. 3 is a top plan view of a modified version of a radiation monitoring device in card form.
Figure 4:
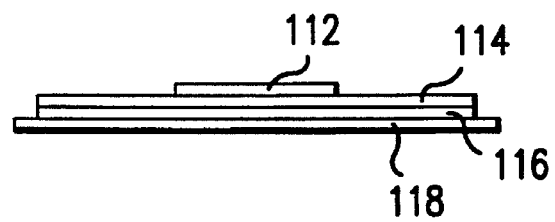
FIG. 4 is a cross-sectional view of the radiation monitoring card of FIG. 3 taken along line 4—4 showing the laminate construction of the monitoring card.

FIG. 3 illustrates another form of monitor of the present invention in which a monitor 100 is provided with a reference color section 110 having reference colors 110a, 110b, 110c and 110d and chromogen coating 112. Referring to FIG. 4, chromogen coating 112 is substantially centered on substrate 114 which is provided with pressure sensitive coating 116 backed by release liner 118. According to this embodiment of the invention, coating 112 comprises microencapsulated chromogen. Thus, a substantially colorless chromogen of the type previously described, such as a fluoran, is microencapsulated, and an aqueous slurry of the microcapsules is used to form coating 112.

The chromogen may be dissolved in a solvent, such as benzyl xylenes, diaryl alkanes, monobutylbiphenyls, monoisopropylbiphenyls, dibutylbiphenyls, di-isopropylbiphenyls, monoisopropylnaphthalenes, di-isopropylnaphthalenes, and hydrogenated terphenyls. Pressure-rupturable microcapsules useful in the present invention may be formed in any suitable manner conventionally employed. For example, capsules formed from coacervation of gelatin, polycondensation of urea-formaldehyde, interfacial crosslinking, or hydrolysis of isoclyanatoamidine products may be used. Preferably, the microcapsules are formed by a microencapsulation process described in U.S. Pat. No. 4,317,743 to Chang, the disclosure of which is hereby incorporated by reference.

The microcapsular coating composition 112 may be applied to the substrate, for example, paper, plastic, or the like, which forms the document by any suitable technique as known in the art to provide a localized, spot or band coating. A preferred method of coating is by off-set gravure coating as disclosed in U.S. Pat. No. B1 4,425,386 to Chang which is hereby incorporated by reference. Alternative preferred coating methods include flexographic, screen printing, nozzle extrusion and ink jet printing.

The color forming Lewis acid may be incorporated directly into substrate 114 in the embodiment of FIGS. 3 and 4, and substrate 114 may be, for example, a polyolefin sheet filled with color forming silica particles. When pressure is applied to surface 120 of coating 112, the pressure-rupturable microcapsules release the chromogen and develop a color upon contact with the silica particles.

This embodiment of the invention is especially preferred, since the technique of applying the chromogen in microcapsules to the Lewis acid incorporated in the underlying substrate provides controlled, even coverage of the resulting visible colored image or color to substrate 114 not achievable by the technique of FIGS. 1–2 in which the combination of chromogen and Lewis acid are coated together. Alternatively, the Lewis acid may be coated on the substrate, rather than incorporated in the substrate, using conventional coating techniques. In such event, layer 114 represents both the substrate and a top coating of color developer in FIG. 4.

Normally, when monitor card 100 is purchased by the end user, coating 112 will be in colored form, since pressure had been previously applied by the supplier of the card to form the base color by reaction of the chromogen with the Lewis acid in substrate 114 directly below coating 112 in substrate 114.

Exposure of coating 112 to sunlight causes the base color to change or fade to a different color with time which color can be compared at any point in time to reference colors 110a–110d to determine degree of exposure and time equivalency of exposure to ultraviolet radiation.

Figure 5:
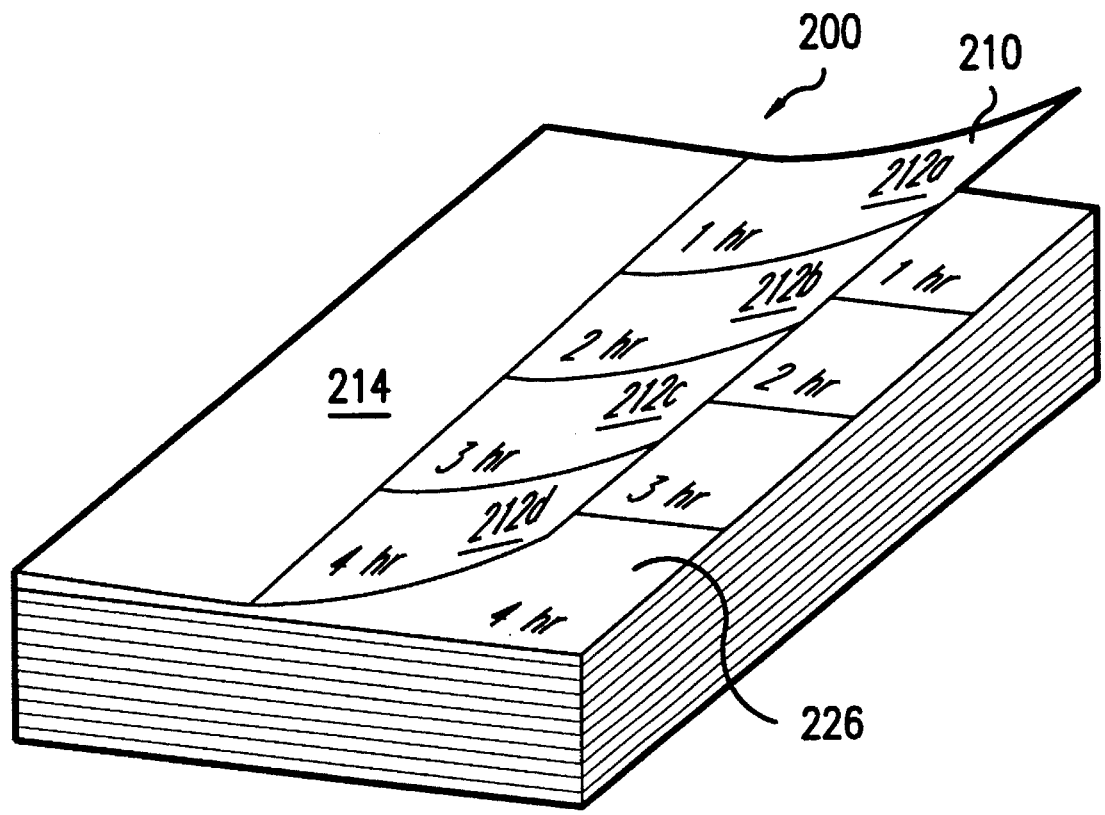
FIG. 5 is a schematic, perspective view of the ultraviolet radiation monitoring system of the present invention in disposable, tear-off pad form.

Referring to FIG. 5, a pad 200 of disposable color monitor tear-off sheets is shown. Top tear-off monitor sheet 210, as well as underlying tear-off monitor sheets, are provided with reference colors 212a, 212b, 212c and 212d as previously described. Section 214 is provided with a base color that is fadeable or changeable under exposure to ultraviolet radiation to different colors with time.

Figure 6:
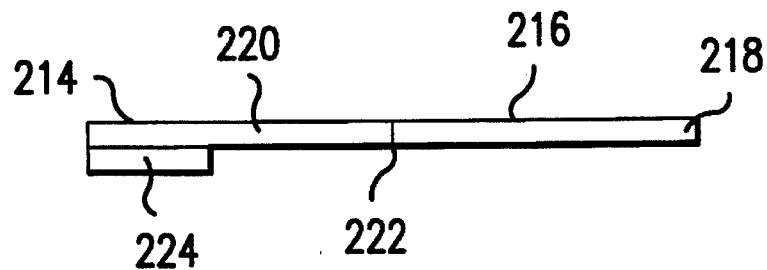
FIG. 6 is an elevational view of a single tear-off sheet from the pad of FIG. 5 having repositional pressure-sensitive adhesive.

Referring to FIG. 6, which is an end view of sheet 210, substrate 216 is shown, which incorporates a Lewis acid or color developer. Section 218 of substrate 216 carries the reference color chart portion of the monitor. A base color is provided to surface 214 of the monitor by applying a chromogen solution to surface 214 to react with the Lewis acid incorporated in substrate 216 in and immediately below surface area 214. Optionally, substrate 216 may be provided with perforations 222 to permit separation of the color chart section 218 from the reference color chart section 220. Thus, if one wishes to adhere only the color monitor portion 220 of substrate 216 to the skin or clothing, portion 220 may be easily separated from color chart section 218 by means of perforations 222. Substrate 216 is provided with pressure sensitive adhesive 224, which is dual-functional, since it both adheres sheet 216 to the underlying sheet 226 which, in turn, is adhered to the next and remaining underlying sheets. In addition, pressure sensitive adhesive 224 can be used to adhere sheet 210 or only section 220 of sheet 210 to the skin or clothing, for example, if desired, after it is separated from underlying sheet 226.

Likewise, pad 200 can comprise only the color monitor portion of top sheet 210, i.e., section 220, and all underlying color monitor sections, without the reference color chart section, i.e., section 218, of each sheet, such that each sheet in the pad terminates at or below perforations 222. In this embodiment, each color monitor sheet comprising the section 220 or underlying corresponding portion can be torn off and used with a single reference color chart which, for example, can be separately packaged with the pad or attached to top sheet 210 only, as shown in FIG. 6.

The invention will be further illustrated by the following examples. It should be understood that they are not intended to limit the scope of this invention. All percentages are by weight unless otherwise indicated.

EXAMPLE 1

A color forming material for coating is prepared from a mixture of 6 grams of 7,7'-bis(3-diethylaminofluoran), 6 grams of benzophenone, and 10 grams of calcium carbonate in 30 grams of a 10 percent aqueous polyvinyl alcohol solution. The mixture is ground in an attritor for one hour to reduce the size of the particles and produce a dispersion.

A color developer is produced by mixing 16 grams of 4-hydroxy-4'-isopropoxyphenylsulfone and 16 grams of dibenzyl oxalate in 64 grams of a 15 percent aqueous polyvinyl alcohol solution. The mixture is ground in an attritor for one hour to reduce the particle size of the components and produce a dispersion.

The color developing material for coating is prepared by mixing equal parts by weight of two dispersions. A spot is then coated on a pressure-sensitive label stock and dried. The coated sample is exposed to UV-A rays in an Accelerated Weathering Tester for 30 minutes. A red color appears in about 90 minutes. Then, the red color changes to orange and then to yellow in 150 minutes.

EXAMPLE 2

An aqueous capsule slurry at 35 percent solids, containing 5.8 dry percent of 2-anilino-3-methyl-6-(ethyl-isopentylamino)fluoran, is coated on a substrate and dried. The coat weight is one pound per 1300 square feet area. The capsule coated substrate is superimposed with a sheet of TESLIN which is a microporous polyolefin sheet filled with fine silica particles manufactured by PPG Industries, Inc., Barberton, Ohio.

Upon the application of pressure, an intense black color is developed on TESLIN. One half of the colored TESLIN (Sample A) is exposed to UV-A rays and another half (Sample B) is exposed to UV-B rays. After two hours of exposure, the black color changes, in turn, to grey, reddish grey and finally a pale red color on each sample.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification.

What is claimed is:

1. An ultraviolet radiation monitoring kit comprising:

at least one first substrate and at least one second substrate, said at least one second substrate being capable of being closely associated with at least one said first substrate, said at least one first substrate having a first surface bearing an indicator area comprising a chromogenic composition, said chromogenic composition comprising (a) the colored reaction product resulting from contact between a chromogen and a color developer, said colored reaction product being capable of changing color when exposed to ultraviolet radiation, or (b) a substantially colorless mixture of a chromogen and a color developer capable of reacting to form color when exposed to ultraviolet radiation, said at least one second substrate having a first surface bearing a reference color chart, said reference color chart comprising a plurality of reference colors, each of said reference colors corresponding to a different time exposure to ultraviolet radiation, such that comparison of the color developed by said chromogenic composition upon exposure to ultraviolet light with a reference color provides an indication of the time and degree of exposure to ultraviolet radiation.

2. The kit of claim 1, wherein said chromogenic composition comprises the colored reaction product of a chromogen and a color developer.

3. The kit of claim 2, wherein said chromogen is an aminofluoran and said color developer is a Lewis acid having poor color stability.

4. The kit of claim 3, wherein said color developer is silica, attapulgite clay or zinc oxide.

5. The kit of claim 2, wherein said color developer is incorporated in said at least one first substrate and said colored reaction product is formed by contacting said first surface of said at least one first substrate with a solution of said chromogen.

6. The kit of claim 5, wherein said color developer is silica.

7. The kit of claim 2, wherein said first surface of said colored reaction product being formed by providing said at least one first substrate with a coating of pressure rupturable microcapsules containing a chromogen, incorporating said color developer in said at least one first substrate, and thereafter applying pressure to said pressure rupturable microcapsules to release said chromogen for reaction with said color developer.

8. The kit of claim 1, wherein said chromogenic composition comprises a substantially colorless mixture of a chromogen and a color developer capable of reacting to form color when exposed to ultraviolet radiation.

9. The kit of claim 8, wherein said chromogen is a substantially colorless, solid fluoran and said color developer is silica.

10. The kit of claim 9, wherein said substantially colorless mixture additionally comprises a sensitizer.

11. The kit of claim 10, wherein said sensitizer comprises a benzophenone.

12. The kit of claim 1, wherein said at least one first substrate has a second surface bearing a pressure sensitive adhesive.

13. The kit of claim 12, wherein said at least one first substrate is superposed over multiple substrates each provided with said indicator area and together forming a disposable multiply tear-off pad.

14. The kit of claim 1, wherein a protective polymeric coating is provided over said chromogenic composition.

15. The kit of claim 1, wherein a third substrate is capable of being closely associated with said at least one first substrate and superposable over said indicator area, said third substrate being impenetrable to ultraviolet radiation.

16. An ultraviolet radiation monitoring device comprising:

a first substrate having a first surface bearing an indicator area comprising a chromogenic composition, said chromogenic composition comprising (a) a substantially colorless mixture of a chromogen and a color developer capable of reacting to form color when exposed to ultraviolet radiation, or (b) the colored reaction product resulting from contact between a chromogen and a color developer, said colored reaction product being capable of changing color when exposed to ultraviolet radiation, said first substrate bearing a reference color chart adjacent said indicator area, said reference color chart comprising a plurality of reference colors, each of said reference colors corresponding to a different time exposure to ultraviolet radiation, such that comparison of the color developed by said chromogenic composition upon exposure to ultraviolet light with a reference color provides an indication of the time and degree of exposure to ultraviolet radiation.

17. A method of determining the time and degree of exposure to ultraviolet radiation which comprises:

placing an ultraviolet radiation monitoring device in the vicinity of an area to be monitored, said ultraviolet radiation monitoring device comprising at least one first substrate and at least one second substrate, said at least one second substrate being capable of being closely associated with at least one first substrate, said at least one first substrate having a first surface bearing an indicator area comprising a chromogenic composition, said chromogenic composition comprising (a) the colored reaction product resulting from contact between a chromogen and a color developer, said colored reaction product being capable of changing color when exposed to ultraviolet radiation, or (b) a substantially colorless mixture of a chromogen and a color developer capable of reacting to form color when exposed to ultraviolet radiation, said at least one second substrate having a first surface bearing a reference color chart, said reference color chart comprising a plurality of reference colors, each of said reference colors corresponding to a different time exposure to ultraviolet radiation, such that comparison of the color developed by said chromogenic composition upon exposure to ultraviolet light with a reference color provides an indication of the time and degree of exposure to ultraviolet radiation, exposing said ultraviolet radiation monitoring device to ultraviolet radiation, periodically comparing the color of said chromogenic composition with a color on the reference color chart to determine the degree of exposure to ultraviolet radiation.

18. An ultraviolet radiation monitoring kit comprising:

at least one first substrate and at least one second substrate, said at least one second substrate being capable of being closely associated with at least one said first substrate, said at least one first substrate having a first surface bearing an indicator area comprising a chromogenic composition, said chromogenic composition having a base color which is the colored reaction product resulting from contact between a chromogen and a color developer, said colored reaction product being capable of fading to a different color when exposed to ultraviolet radiation, said at least one second substrate having a first surface bearing a reference color chart, said reference color chart comprising at least one reference color corresponding to time exposure to ultraviolet radiation, such that comparison of the color developed by said chromogenic composition upon exposure to ultraviolet light with a reference color provides an indication of the time and degree of exposure to ultraviolet radiation.

19. The kit of claim 18, wherein said chromogen is an aminofluoran and said color developer is a Lewis acid having poor color stability.

20. The kit of claim 19, wherein said color developer is silica, attapulgite clay or zinc oxide.

21. The kit of claim 18, wherein said color developer is incorporated in said at least one first substrate and said colored reaction product is formed by contacting said first surface of said at least one first substrate with a solution of said chromogen.

22. The kit of claim 21, wherein said color developer is silica.

23. The kit of claim 18, wherein said first surface of said colored reaction product being formed by providing said at least one first substrate with a coating of pressure rupturable microcapsules containing a chromogen, incorporating said color developer in said first substrate, and thereafter applying pressure to said pressure rupturable microcapsules to release said chromogen for reaction with said color developer.

24. The kit of claim 18, wherein said at least one first substrate has a second surface bearing a pressure sensitive adhesive.

25. The kit of claim 24, wherein said at least one first substrate is superposed over multiple substrates each provided with said indicator area and together forming a disposable multiply tear-off pad.

26. The kit of claim 18, wherein a protective polymeric coating is provided over said chromogenic composition.

27. The kit of claim 18, wherein a third substrate is capable of being closely associated with said at least one first substrate and superposable over said indicator area, said third substrate being impenetrable to ultraviolet radiation.

28. An ultraviolet radiation monitoring device comprising:

a first substrate having a first surface bearing an indicator area comprising a chromogenic composition, said chromogenic composition comprising the colored reaction product of a chromogen and a color developer, said colored reaction product being capable of fading to a different color when exposed to ultraviolet light, said first substrate bearing a reference color chart adjacent said indicator area, said reference color chart comprising at least one reference color corresponding to time exposure to ultraviolet radiation, such that comparison of the color developed by said chromogenic composition upon exposure to ultraviolet light with a reference color provides an indication of the time and degree of exposure to ultraviolet radiation.

29. A method of determining the time and degree of exposure to ultraviolet radiation which comprises:

placing an ultraviolet radiation monitoring device in the vicinity of area to be monitored, said ultraviolet radiation monitoring device comprising at least one first substrate and at least one second substrate, said at least one second substrate being capable of being closely associated with at least one first substrate, said at least one first substrate having a first surface bearing an indicator area comprising a chromogenic composition, said chromogenic composition comprising the colored reaction product of a chromogen and a color developer, said colored reaction product being capable of changing color when exposed to ultraviolet radiation, said at least one second substrate having a first surface bearing a reference color chart, said reference color chart comprising at least one reference color corresponding to time exposure to ultraviolet radiation, such that comparison of the color developed by said chromogenic composition upon exposure to ultraviolet light with a reference color provides an indication of the time and degree of exposure to ultraviolet radiation, exposing said ultraviolet radiation monitoring device to ultraviolet radiation, periodically comparing the color of said chromogenic composition with a color on the reference color chart to determine the degree of exposure to ultraviolet radiation.

30. An ultraviolet radiation monitoring device comprising:

a first substrate having a first surface bearing an indicator area comprising a chromogenic composition, said chromogenic composition comprising (a) a substantially colorless mixture of a chromogen and a color developer capable of reacting to form color when exposed to ultraviolet radiation, or (b) the colored reaction product of a chromogen and a color developer, said color developer being attapulgite clay, silica, zinc oxide, a non-metal chelated phenol, a non-metal chelated phenolic novolac alkyl salicylic acid, or a salicylic acid resin, said first substrate bearing a reference color chart adjacent said indicator area, said reference color chart comprising at least one reference color corresponding to time exposure to ultraviolet radiation, such that comparison of the color developed by said chromogenic composition upon exposure to ultraviolet light with a reference color provides an indication of the time and degree of exposure to ultraviolet radiation.

31. The ultraviolet radiation monitoring device of claim 30, wherein said color developing agent is silica.

32. The ultraviolet radiation monitoring device of claim 31, wherein said chromogen is 2-anilino-3-methyl-6-(ethylisopentylamino)fluoran.

* * * * *